(12) United States Patent
Kobayashi

(10) Patent No.: US 8,402,239 B2
(45) Date of Patent: *Mar. 19, 2013

(54) VOLUME MANAGEMENT FOR NETWORK-TYPE STORAGE DEVICES

(75) Inventor: Ikuko Kobayashi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/327,332

(22) Filed: Dec. 15, 2011

(65) Prior Publication Data

US 2012/0131296 A1     May 24, 2012

Related U.S. Application Data

(63) Continuation of application No. 12/314,276, filed on Dec. 8, 2008, now Pat. No. 8,103,826.

(30) Foreign Application Priority Data

Oct. 16, 2008 (JP) ................................. 2008-266967

(51) Int. Cl.
G06F 12/00 (2006.01)
(52) U.S. Cl. .................... 711/162; 711/100; 711/170
(58) Field of Classification Search .................. 711/100, 711/162, 170
See application file for complete search history.

(56) References Cited

U.S. PATENT DOCUMENTS

| | | | |
|---|---|---|---|
| 7,275,103 B1 * | 9/2007 | Thrasher et al. | 709/224 |
| 2005/0149688 A1 | 7/2005 | Kitamura et al. | |
| 2007/0233704 A1 | 10/2007 | Shiga et al. | |
| 2008/0082777 A1 | 4/2008 | Sakaguchi et al. | |
| 2008/0126437 A1 | 5/2008 | Chiba | |

FOREIGN PATENT DOCUMENTS

JP     2006-092054     4/2006

* cited by examiner

*Primary Examiner* — Jasmine Song
(74) *Attorney, Agent, or Firm* — Stites & Harbison, PLLC; Juan Carlos A. Marquez, Esq.; Nicholas B. Trenkle, Esq.

(57) ABSTRACT

An administrator's work load increases because the administrator has to both allocate volumes of PC server device applications and take over volumes for applications based on changes in PC server devices. A volume management system solves the problem with a computer system having storage devices each having a unit managing volume configuration information based on each application, a unit managing volume usage information based on the application volumes, and a unit managing and partitioning allocatable areas of the storage devices based on performance and reliability. The system has a unit selecting suitable allocation regions in accordance with the volume usages of the applications; a unit selecting a suitable allocation region based on change of host performance and migrating a volume to the suitable allocation region when the host configuration of an application changes; and a unit changing configuration information to perform change of setting on each host.

4 Claims, 17 Drawing Sheets

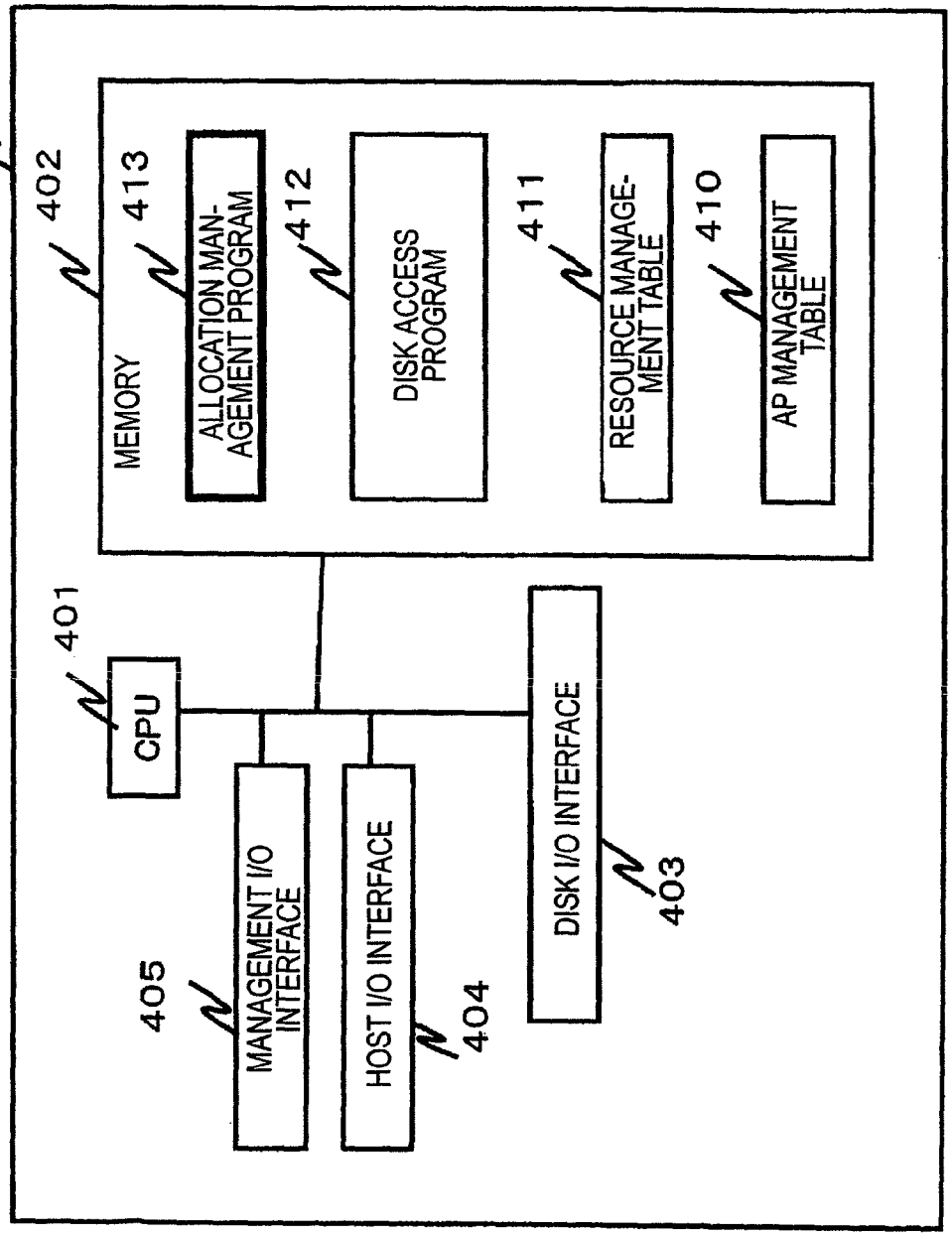

FIG. 6
AP MANAGEMENT TABLE

AP TABLE 410-1

| APID | HOST ID INFORMATION | OS TYPE | HOST PERFORMANCE | AP TYPE |
|---|---|---|---|---|
| AP-A | 172.15.0.1 | Windows | 1.0 | Mail |
| AP-B | 172.15.0.1 | Windows | 1.0 | DB |
| | | | | |

Columns: 41011, 41012, 41013, 41014, 41015

VOLUME TABLE 410-2

| APID | VOLUME ID | FORMAT CHARACTERISTIC | DATA TYPE |
|---|---|---|---|
| AP-A | VOL1 | Partial | File |
| AP-A | VOL2 | Whole | DB |
| AP-B | VOL1 | Whole | DB |
| | | | |

Columns: 41021, 41022, 41023, 41024

AP-VOLUME CORRESPONDENCE TABLE 410-3

| APID | VOLUME ID | TARGET NAME | PORT ADDRESS | INITIATOR NAME |
|---|---|---|---|---|
| AP-A | VOL1 | Target 1 | 172.16.0.1 | Initiator 1 |
| AP-A | VOL2 | Target 2 | 172.16.0.1 | Initiator 1 |
| AP-B | VOL1 | Target 3 | 172.16.0.2 | Initiator 1 |
| : | : | : | : | |

Columns: 41031, 41032, 41033, 41034, 41035

VOLUME-RAID-G CORRESPONDENCE TABLE 410-4

| APID | VOLUME ID | RAID-G | LU NUMBER | IO PERFORMANCE |
|---|---|---|---|---|
| AP-A | VOL1 | 0 | 1 | 50 |
| AP-A | VOL2 | 0 | 2 | 100 |
| AP-B | VOL1 | 0 | 3 | 100 |
| : | : | : | : | |

Columns: 41041, 41042, 41043, 41044, 41045

FIG. 7
AP MANAGEMENT TABLE (AFTER CHANGE)

AP TABLE  410-1A

| APID | HOST ID INFORMATION | OS TYPEID | HOST PERFORMANCE | AP TYPE |
|---|---|---|---|---|
| AP-A | 172.15.0.1 | Windows | 1.0 | Mail |
| AP-B | 172.15.0.2 | Windows | 2.0 | DB |
|  |  |  |  |  |

41011, 41012, 41013, 41014, 41015

AP-VOLUME CORRESPONDENCE TABLE  410-3A

| APID | VOLUME ID | TARGET NAME | PORT ADDRESS | INITIATOR NAME |
|---|---|---|---|---|
| AP-A | VOL1 | Target 1 | 172.16.0.1 | Initiator 1 |
| AP-A | VOL2 | Target 2 | 172.16.0.1 | Initiator 1 |
| AP-B | VOL1 | Target 3 | 172.16.0.3 | Initiator 2 |
| : | : | : | : |  |

41031, 41032, 41033, 41034, 41035

VOLUME-RAID-G CORRESPONDENCE TABLE  410-4A

| APID | VOLUME ID | RAID-G | LU NUMBER | IO PERFORMANCE |
|---|---|---|---|---|
| AP-A | VOL1 | 0 | 1 | 50 |
| AP-A | VOL2 | 0 | 2 | 100 |
| AP-B | VOL1 | 1 | 3 | 110 |
| : | : | : | : |  |

RESOURCE MANAGEMENT TABLE 411-1

DEVICE INFORMATION TABLE

| DEVICE ID 41111 | MANAGEMENT PORT 41112 |
|---|---|
| 0 | 172.17.0.1 |
| 1 | 172.17.0.2 |

RAID-G INFORMATION TABLE 411-2

| DEVICE ID 41121 | RAID-G 41122 | HDD TYPE 41123 | REGION ALLOCATION METHOD 41124 | FREE CAPACITY 41125 | NUMBER OF IOs 41126 |
|---|---|---|---|---|---|
| 0 | 0 | SAS | Real | 500 | 250 |
| 0 | 1 | SAS | Real | 1000 | 0 |
| 1 | 0 | SATA | Virtual | 1000 | 0 |
| 1 | 1 | SATA | Virtual | 1000 | 0 |

FIG. 9
AP REGISTRATION TABLE

HOST 1

110-1

| APID | VOLUME ID | PORT ADDRESS |
|---|---|---|
| AP-A | VOL1 | 172.16.0.1 |
| AP-A | VOL2 | 172.16.0.1 |
| AP-B | VOL1 | 172.16.0.2 |

(DELETE)

110-1A

| APID | VOLUME ID | PORT ADDRESS |
|---|---|---|
| AP-A | VOL1 | 172.16.0.1 |
| AP-A | VOL2 | 172.16.0.1 |
|  |  |  |

(DELETED)

HOST 2

110-2

| APID | VOLUME ID | PORT ADDRESS |
|---|---|---|
| AP-B | VOL1 |  |

(REGISTER)

110-2A

| APID | VOLUME ID | PORT ADDRESS |
|---|---|---|
| AP-B | VOL1 | 172.16.0.3 |

(AFTER CONFIGURATION CHANGE PROCESS)

FLOW OF CONFIGURATION CHANGE PROCESS

FIG. 12

AP REGISTRATION
TABLE 110-2A

| APID | VOLUME ID | PORT ADDRESS |
|------|-----------|--------------|
| AP-B | VOL1 | 172.16.0.3 |
| AP-C | VOL1 | |

110-2B

| APID | VOLUME ID | PORT ADDRESS |
|------|-----------|--------------|
| AP-B | VOL1 | 172.16.0.3 |
| AP-C | VOL1 | 172.16.0.5 |

RESOURCE MANAGEMENT TABLE

| DEVICE ID | RAID-G | HDD TYPE | REGION ALLOCATION METHOD | FREE CAPACITY | NUMBER OF IOs |
|---|---|---|---|---|---|
| 0 | 0 | SAS | Real | 800 | 150 |
| 0 | 1 | SAS | Real | 700 | 100 |
| 1 | 0 | SATA | Virtual | 1000 | 0 |
| 1 | 1 | SATA | Virtual | 1000 | 0 |

FIG. 14
AP MANAGEMENT TABLE (AFTER CHANGE)

AP TABLE  410-1B

| APID | HOST ID INFORMATION | OS TYPE | HOST PER-FORMANCE | AP TYPE |
|---|---|---|---|---|
| AP-C | 172.15.0.2 | Windows | 2.0 | File |
| | | | | |
| | | | | |

41011, 41012, 41013, 41014, 41015

VOLUME TABLE  410-2B

| APID | VOLUME ID | FORMAT CHAR-ACTERISTIC | DATA TYPE |
|---|---|---|---|
| AP-C | VOL1 | Partial | File |
| | | | |
| | | | |
| | | | |

41021, 41022, 41023, 41024

AP-VOLUME CORRESPONDENCE TABLE  410-3B

| APID | VOLUME ID | TARGET NAME | PORT ADDRESS | INITIATOR NAME |
|---|---|---|---|---|
| AP-C | VOL1 | Target 11 | 172.16.0.5 | Initiator 2 |
| | | | | |
| | | | | |
| : | : | : | : | |

41031, 41032, 41033, 41034, 41035

VOLUME-RAID-G CORRESPONDENCE TABLE  410-4B

| APID | VOLUME ID | RAID-G | LU NUMBER | IO PERFOR-MANCE |
|---|---|---|---|---|
| AP-C | VOL1 | 0 | 0 | |
| | | | | |
| | | | | |
| | | | : | |

41041, 41042, 41043, 41044, 41045

FLOW OF ALLOCATION PROCESS

SEQUENCE DIAGRAM OF CONFIGURATION CHANGE PROCESS

SEQUENCE DIAGRAM OF ALLOCATION PROCESS

VOLUME MANAGEMENT FOR NETWORK-TYPE STORAGE DEVICES

CROSS REFERENCES TO RELATED APPLICATIONS

The present application is a Continuation application of U.S. application Ser. No. 12/314,276 filed Dec. 8, 2008. Priority is claimed from U.S. application Ser. No. 12/314,276 filed on Dec. 8, 2008, which claims priority from Japanese Patent Application No. 2008-266967, filed on Oct. 16, 2008, the entire disclosure of which is incorporated herein by reference.

1. FIELD OF THE INVENTION

The present invention relates to a volume management system in a computer system in which disks equivalent to local disks of host computers are integrated into network-type storage devices so that the host computers can use these disks via a storage area network (SAN).

2. DESCRIPTION OF THE RELATED ART

Network-type storage devices (hereinafter referred to as storage devices) which can be connected to host computers by iSCSI (internet Small Computer System Interface) or FC (Fibre Channel) have come into practical use in recent years. In a computer system using such storage devices, the storage devices are logically partitioned into storage areas called LUs (Logical Units) so that each host can use the LUs in place of local HDDs (Hard Disk Drives).

Although mainframe/server devices were usually chiefly used as the host computers, inexpensive PC (Personal Computer) server devices have been used widely as the host computers with the advance of popularization and cost reduction of the storage devices. In a system using such PC server devices, the number of the PC server devices is large and each PC server device is frequently replaced with a new one because of device failure, upgrade of device performance, etc. compared with a system using the mainframe/server devices. For this reason, the work load imposed on an administrator increases because the administrator has heretofore performed the work of allocating volumes to applications of the PC server devices (such as generation of LUs, setting of paths to the generated LUs, and setting of paths to the PC server devices) and the work of taking over volumes for applications in accordance with replacement of PC server devices (such as changing of the paths to the generated LUs, and changing of the paths to the PC server devices). JP-A-2006-92054 has been proposed on a configuration change process at the time of volume migration.

SUMMARY OF THE INVENTION

The related art system is designed so that when a volume is migrated between storage devices, each computer can be connected to the migration destination volume without interruption. In the related art system, it is possible to lighten the load imposed on the administrator at the time of volume migration but it is impossible to lighten the load imposed on the administrator with respect to volume generation, environment setting work concerned with migration between computers, etc.

An object of the invention is to provide a function of lightening the load imposed on an administrator for a volume generation and configuration change process by managing volumes used by applications in accordance with the applications and using characteristics of the applications and information about host environments where the applications are operated.

The volume management system in the computer system according to the invention is a volume management system in a computer system having storage devices each of which has a unit which manages volume configuration information in accordance with each application, a unit which manages volume usage information in accordance with each of volumes for the applications, and a unit which manages allocatable areas of the storage devices while partitioning the allocatable areas of the storage devices in accordance with performance and reliability, wherein the volume management system has: a unit which selects suitable allocation regions in accordance with the volume usages of the applications; a unit which selects a suitable allocation region in accordance with change of host performance and migrates a volume to the suitable allocation region when host configuration of an application is changed; and a unit which changes configuration information to perform change of setting on each host.

According to the invention, generation of volumes and setting change work due to change in host configuration can be performed by each storage device in accordance with the volume usages of the applications, so that the number of administrator's operations can be reduced. In addition, allocation of volumes can be decided in accordance with the volume usages of the applications, so that a problem concerned with performance competition among the applications can be prevented in advance. Further, when a problem such as HDD failure occurred in a storage device, the storage device can identify a host and an application related to the problem.

BRIEF DESCRIPTION OF THE DRAWINGS

FIG. 5 is an explanatory diagram conceptually showing the internal configuration of each storage device in Embodiment 1 of the invention;

FIG. 6 is an explanatory view of an AP management table stored in a memory of each storage device in Embodiment 1 of the invention;

FIG. 7 is an explanatory view of the AP management table stored in a memory of each storage device after the configuration change in Embodiment 1 of the invention;

FIG. 8 is an explanatory view of a resource management table stored in a memory of each storage device in Embodiment 1 of the invention;

FIG. 9 is an explanatory view of an AP registration table stored in a memory of each host in Embodiment 1 of the invention;

FIG. 12 is an explanatory view of an AP registration table concerned with the allocation process in Embodiment 2 of the invention;

FIG. 14 is an explanatory view of an AP management table stored in a memory of each storage device after configuration change in Embodiment 2 of the invention;

DETAILED DESCRIPTION OF THE INVENTION

Embodiments of the invention will be described below with reference to the drawings.

Embodiment 1

Figure 1:
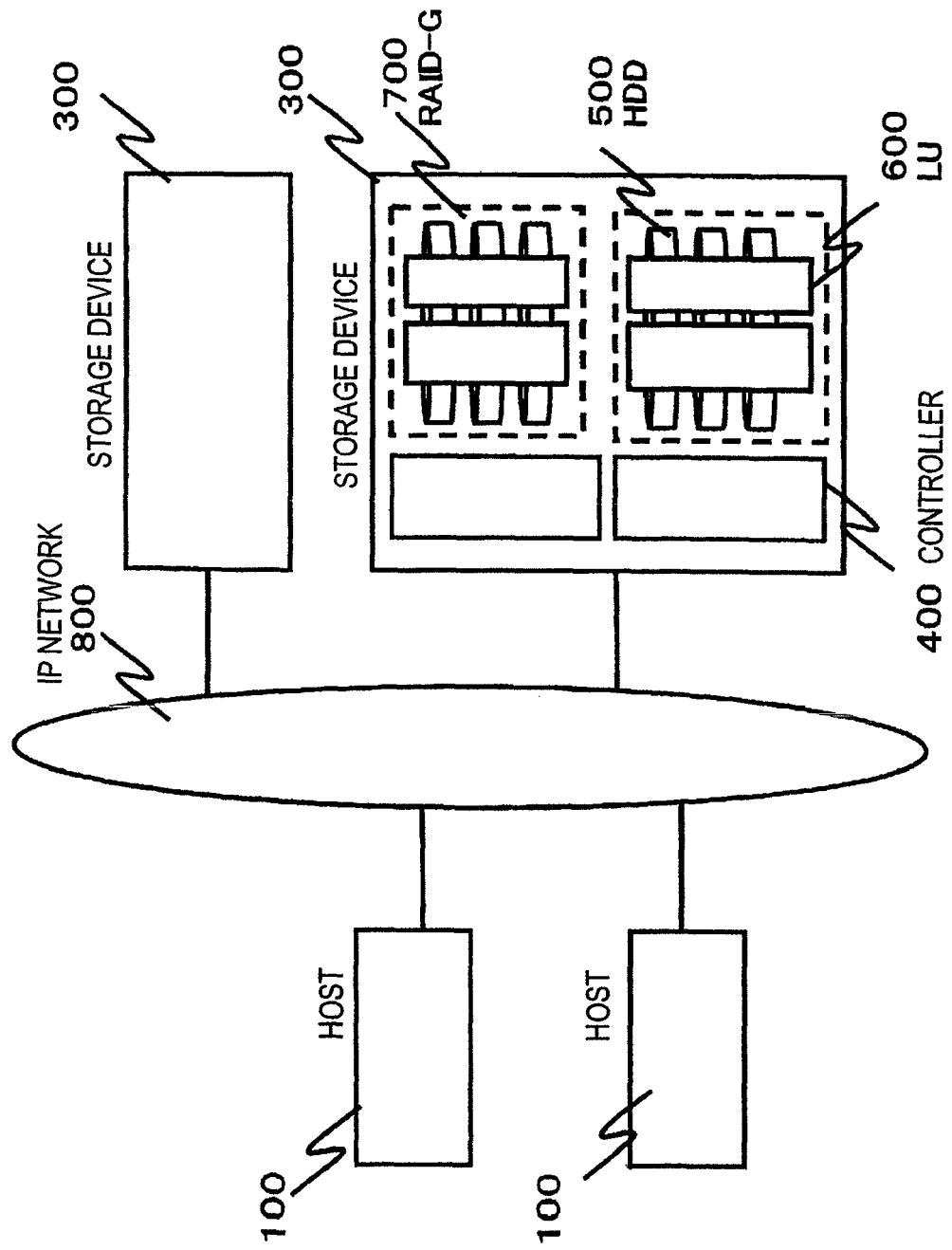
FIG. 1 is an explanatory diagram showing the schematic configuration of a computer system according to Embodiment 1 of the invention.
Figure 2:
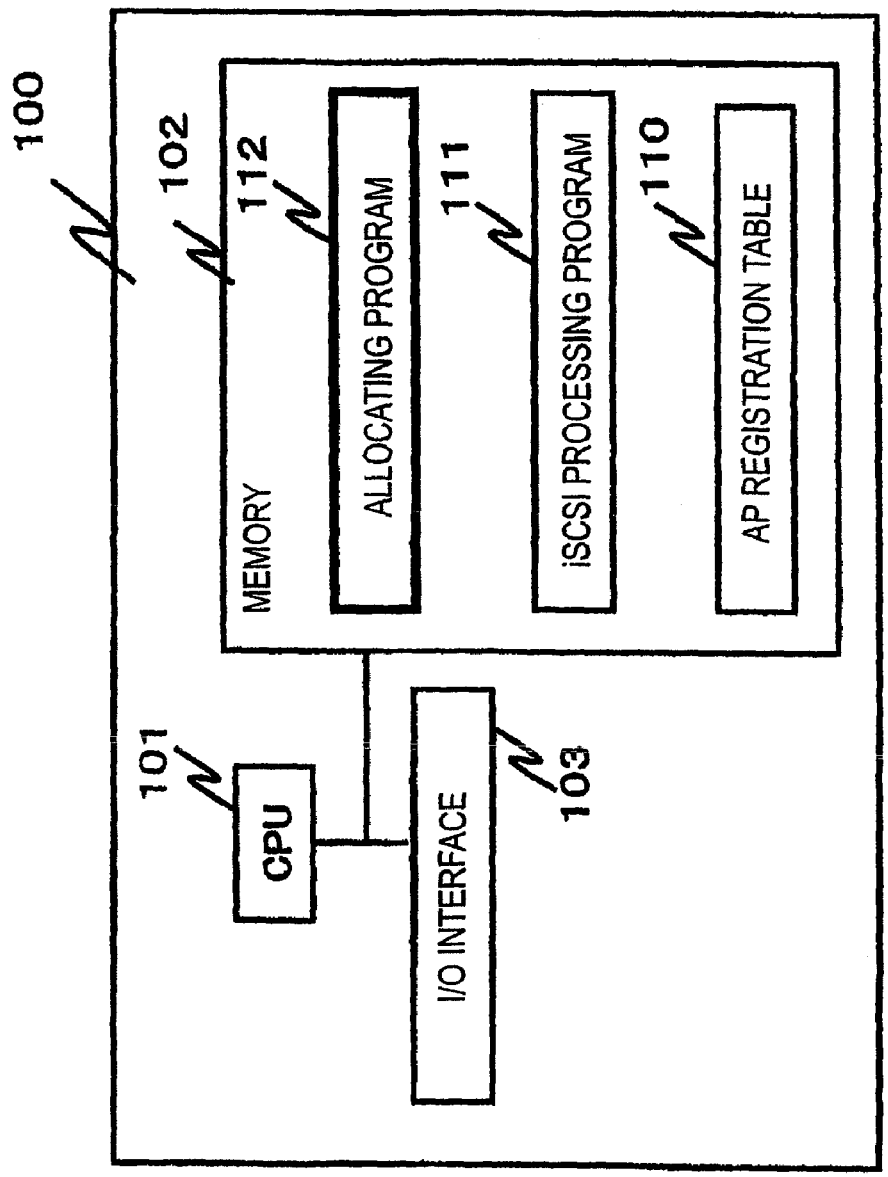
FIG. 2 is an explanatory diagram conceptually showing the internal configuration of each host in Embodiment 1 of the invention.

First, the configuration of a system according to the invention will be described. The schematic configuration of a computer system according to an embodiment of the invention will be described with reference to FIGS. 1, 2 and 5. FIG. 1 is an explanatory diagram showing the schematic configuration of the computer system according to the embodiment. FIG. 2 is an explanatory diagram conceptually showing the internal configuration of each host in the embodiment. FIG. 5 is an explanatory diagram conceptually showing the internal configuration of a controller of each storage device in the embodiment.

As shown in FIG. 1, the computer system according to the embodiment includes hosts 100, and storage devices 300. The hosts 100 are used by users. The storage devices 300 have logical units (LUs) 600 used by the hosts. The hosts 100 and the storage devices 300 are connected to one another through an IP (Internet Protocol) network 800. The IP network 800 is a local area network (LAN) which is constructed by Ethernet (registered trademark) and which uses TCP/UDP/IP (Transmission Control Protocol/User Datagram Protocol/Internet Protocol) as a communication protocol for execution of data transmission. In this embodiment, an iSCSI protocol is used for communication between the hosts 100 and the storage devices 300. Alternatively, an FC protocol may be used for communication between the hosts 100 and the storage devices 300. In this case, an FC network is used between the hosts 100 and the storage devices 300.

Each Storage device 300 has a controller 400, and a plurality of magnetic hard disk drives (HDDs) 500. The storage device 300 is a disk array device in which each redundant array of independent disks (RAID) is made up of a plurality of HDDs 500. The storage device 300 provides one or a plurality of RAID groups (RAID-G) 700 each having an RAID structure. Each RAID-G 700 provides one or a plurality of logical volumes. Each logical volume is also called logical unit (LU) 600.

As shown in FIG. 5, the controller 400 of each storage device 300 has a CPU (Central Processing Unit) 401, a memory 402, a disk I/O (Input/Output) interface 403, a host I/O interface 404, and a management I/O interface 405 inside thereof. The CPU 401, the memory 402 and the I/O interfaces 403, 404 and 405 are connected to one another through a bus. The CPU 401 is a processing unit which executes various programs stored in the memory 402. The memory 402 is a so-called internal storage device including both a nonvolatile memory for storing various programs etc. and a volatile memory for temporarily storing results of processing. The disk I/O interface 403 is connected to the HDDs 500. The host I/O interface 404 is connected to the hosts 100 through the IP network 800. The management I/O interface 405 is connected to a management computer (not shown) through the IP network 800.

The memory 402 stores an AP (Application) management table 410, a resource management table 411, a disk access program 412 and an allocation management program 413.

The AP management table 410 is an area where information about applications and information about storage resources allocated to the applications are stored. The resource management table 411 is an area where information on capacities and use statuses of RAID-Gs are stored. The disk access program 412 receives read/write commands for LUs from the host I/O interface 404 and executes these commands by using the disk I/O interface 403. The allocation management program 413 is a program related to the system according to the invention and provided for performing a volume allocating process.

As shown in FIG. 2, each host 100 has a CPU 101, a memory 102, and an I/O interface 103 inside thereof. The CPU 101, the memory 102 and the I/O interface 103 are connected to one another through a bus. The CPU 101 is a processing unit which executes various programs stored in the memory 102. The memory 102 is a so-called internal storage device including both a nonvolatile memory for storing various programs etc. and a volatile memory for temporarily storing results of processing. The I/O interface 103 is connected to the storage devices 300 through the IP network 800.

The memory 102 stores an AP registration table 110, an iSCSI processing program 111 and an allocating program 112. The iSCSI processing program 111 is a program which transmits SCSI I/O commands issued from the OS (Operating System) of each host to the storage devices 300 by use of the TCP/IP protocol. The allocating program 112 is a program related to the system according to the invention. The allocating program 112 generates volumes of applications called from a discovery process of the iSCSI processing program 111 and registered in the AP registration table 110 and performs volume configuration change.

The LU configuration of the storage devices according to the embodiment will be described below with reference to FIG. 3. The iSCSI processing program 111 of each host 100 is connected to the storage devices 300 by using ID information called target. As for iSCSI, the target information contains an IP address for identifying a port of the host I/O interface 404, a target name, and an initiator name. One or more logical units are mapped for one target. When a host 100 is connected to a target of a storage device 300, one or more LUs mapped for the target are mounted on the host 100. In this system, applications AP-A and AP-B are operated in each host and each of the applications has at least one target and at least one LU.

The configuration of the AP registration table in FIG. 2 will be described below with reference to FIG. 9. The AP registration table 110 is a table in which volumes of applications to be subjected to volume allocation and configuration change are registered. The AP registration table 110 is information which is set in each host by an administrator. In the AP registration table, identifiers for identifying applications uniquely in the system are registered in a column "APID" 1101. In addition, identifiers for individually identifying a plurality of volumes of an application are registered in a column "Volume ID" 1102. Port addresses of storage devices where volumes are generated are set in a column "Port Address" 1103 by the allocating program 112.

Successively, the configuration of the AP management table in FIG. 5 will be described with reference to FIG. 6. The AP management table 410 contains an AP table 410-1, a volume table 410-2, an AP-volume correspondence table 410-3 and a volume-RAID-G correspondence table 410-4.

When volumes are allocated to applications, the AP table 410-1 is generated by the allocation management program 413 of the controller 400 of each storage device 300. The AP table 410-1 has a column "Host ID Information" 41012 for identifying each host where an application is located, a column "OS Type" 41013 for identifying an OS operated in the host, a column "Host Performance" 41014 for expressing CPU performance of the host, a column "AP Type" 41015 for expressing the type of the application, and a column "APID" 41011 for identifying the application. IP addresses of hosts can be used in the column "Host ID Information" 41012. OS names can be used in the column "OS Type" 41013. Clock values of CPUs can be used in the column "Host Performance" 41014. Application names can be used in the column "AP Type" 41015.

The volume table 410-2 is a table in which characteristics of volumes used by applications are described. When volumes are allocated to applications, the volume table 410-2 is generated by the allocation management program 413 of the controller 400 of each storage device 300. The volume table 410-2 has a column "APID" 41021 for identifying each application, a column "Volume ID" 41022 for identifying each individual volume used by the application, a column "Format Characteristic" 41023 for expressing a volume formatting method performed by the application, and a column "Data Type" 41024 for expressing data stored in the volume by the application. Since there are two cases, i.e. the case where the application performs formatting on all of the volume and the case where the application performs formatting on part of the volume, the column "Format Characteristic" 41023 is used for discriminating between these two cases. There are a DB type, a text type, an image type, etc. as the type of data stored in the volume. The column "Data Type" 41024 is used for identifying the type of data.

The AP-volume correspondence table 410-3 is a table in which information about paths of volumes allocated to applications is described. When volumes are allocated to applications, the AP-volume correspondence table 410-3 is generated by the allocation management program 413 of the controller 400 of each storage device 300. The AP-volume correspondence table 410-3 has a column "Target Name" 41033, a column "Port Address" 41034, and a column "Initiator Name" 41035.

The volume-RAID-G correspondence table 410-4 is a table in which information about RAID groups having the volumes generated therein is described. When volumes are allocated to applications, the volume-RAID-G correspondence table 410-4 is generated by the allocation management program 413 of the controller 400 of each storage device 300. A column "RAID-G" 41043 indicates generated RAID-Gs. A column "LU Number" 41044 indicates generated LUs. A column "IO Performance" 41045 indicates average IO performance values of volumes. After allocation, the column "IP Performance" 41045 is periodically set by the allocation management program 413.

The configuration of the resource management table in FIG. 5 will be described below with reference to FIG. 8. The resource management table 411 contains a device information table 411-1, and an RAID-G information tale 411-2. The device information table 411-1 is a table in which information about storage devices 300 allowed to be subjected to volume allocation is described. The device information table 411-1 is information which is set in each storage device by the administrator in advance. The device information table 411-1 has a column "Device ID" 41111 for identifying a device, and a column "Management Port Address" 41112 which is used when the allocation management program 413 communicates with the allocation management program 413 of another controller.

The RAID-G information table 411-2 is a table in which information about RAID-Gs generated in the respective storage devices is described. Information of the respective storage devices is set by the administrator in advance. The allocation management program 413 of the controller 400 of each storage device 300 can acquire the RAID-G information table 411-2 from devices registered in the device information table 411-1. A column "RAID-G" 41122 indicates information for identifying an RAID-G in the device. A column "HDD Type" 41123 indicates the type of HDDs (SAS, SATA, or the like) forming the RAID group. The RAID-G can be changed in accordance with usages such as reliability and performance.

A column "Region Allocation Method" 41124 indicates whether the RAID-G has a function of allocating a region to an LU statically or dynamically. As for the static allocation function, HDDs are allocated to the LU in advance. As for the dynamic allocation function, HDDs are allocated to the LU only when WRITE occurs in the LU, so that the used capacity of the HDDs can be reduced. A column "Number of IOs" 41126 indicates the total number of IOs for each volume in the RAID group. After allocation, the column "Number of IOs" 41126 is periodically set by the allocation management program 413 of the controller 400 of each storage device 300.

Figure 10:
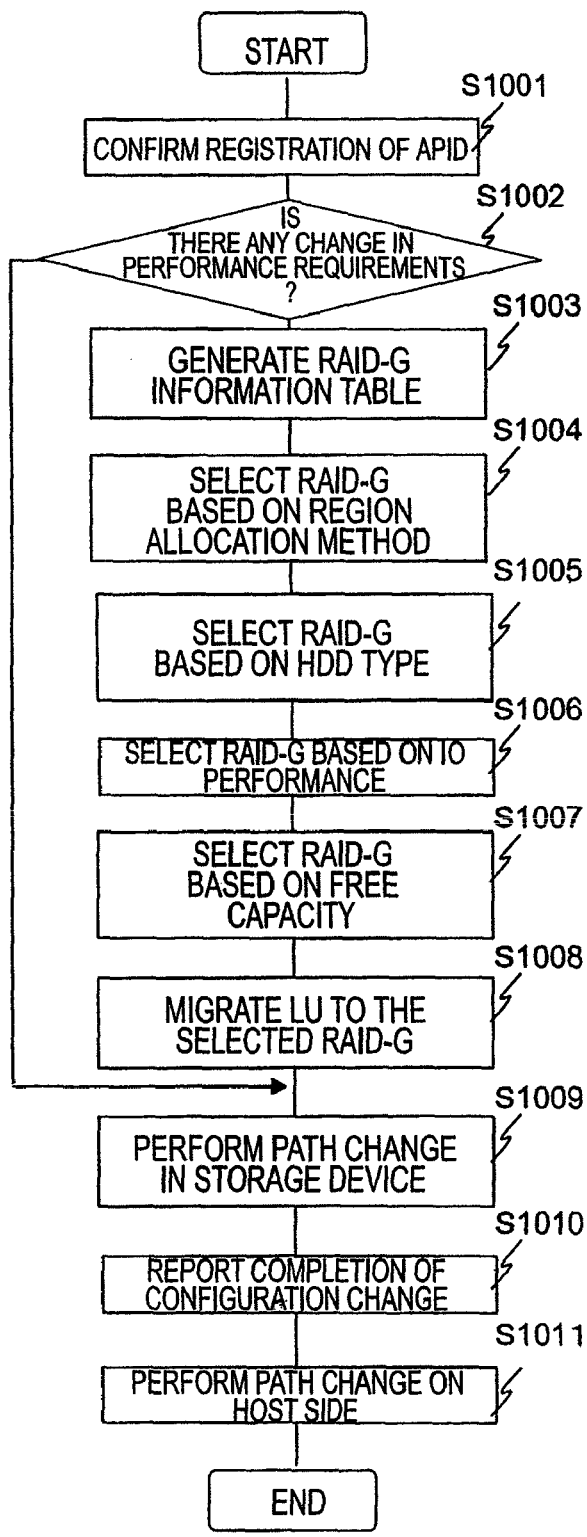
FIG. 10 is a flow chart showing a configuration change process in Embodiment 1 of the invention.
Figure 16:
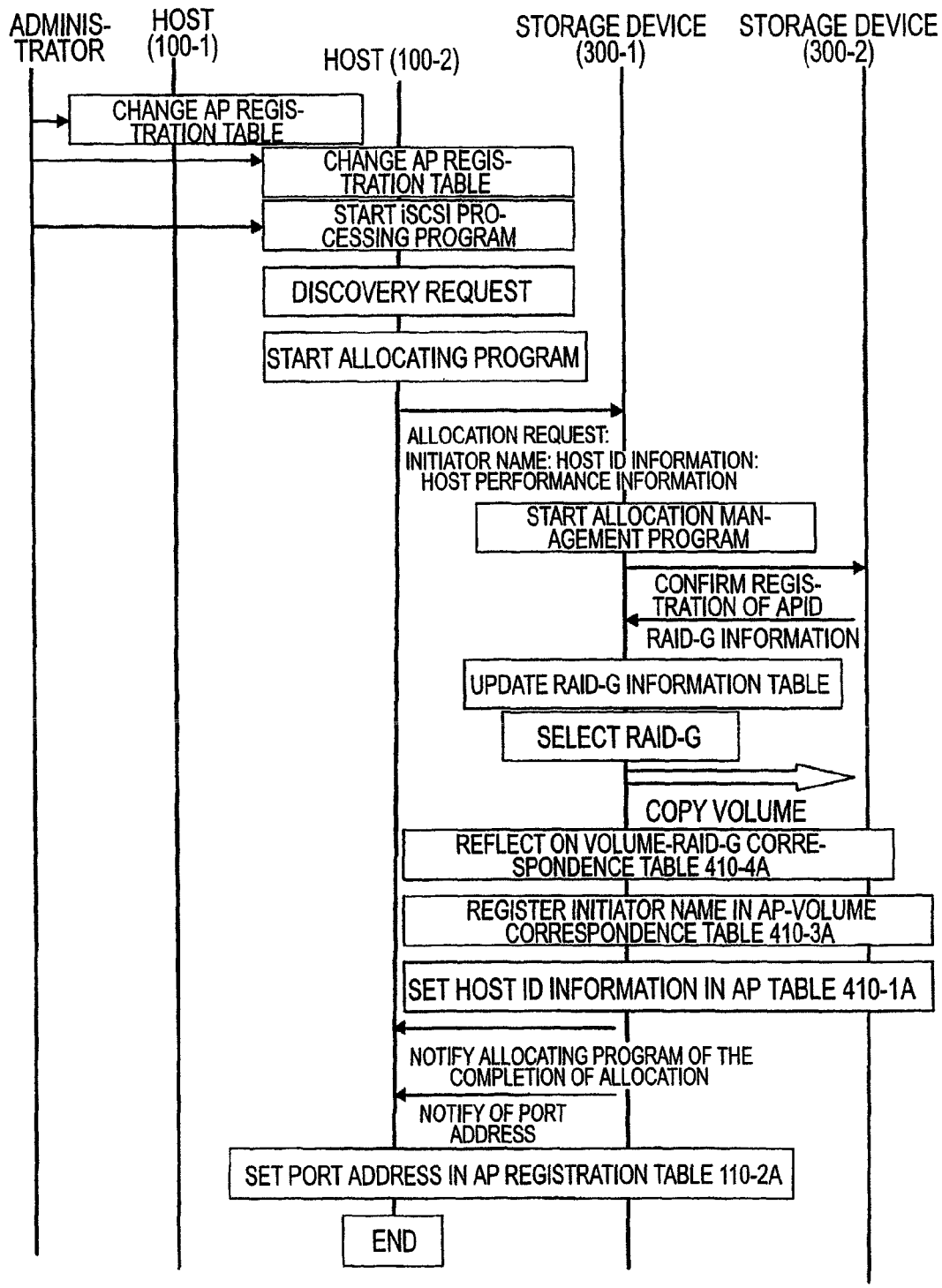
FIG. 16 is a sequence diagram showing the configuration change process in Embodiment 1 of the invention.

The outline of a configuration change process will be described below with reference to FIGS. 3 to 9. FIG. 10 is a flow chart showing the configuration change process. FIG. 16 is a sequence diagram showing the configuration change process.

The configuration change mentioned herein is based on the assumption that after volumes are allocated to AP-A and AP-B in a host 100-1, AP-B is migrated to a host 100-2 so that the load imposed on the host 100-1 can be shared. The configuration change process is a process by which the volume allocated to AP-B is permitted to be used in the host 100-2. An allocation process for newly allocating a volume to an application will be described in Embodiment 2.

Figure 3:
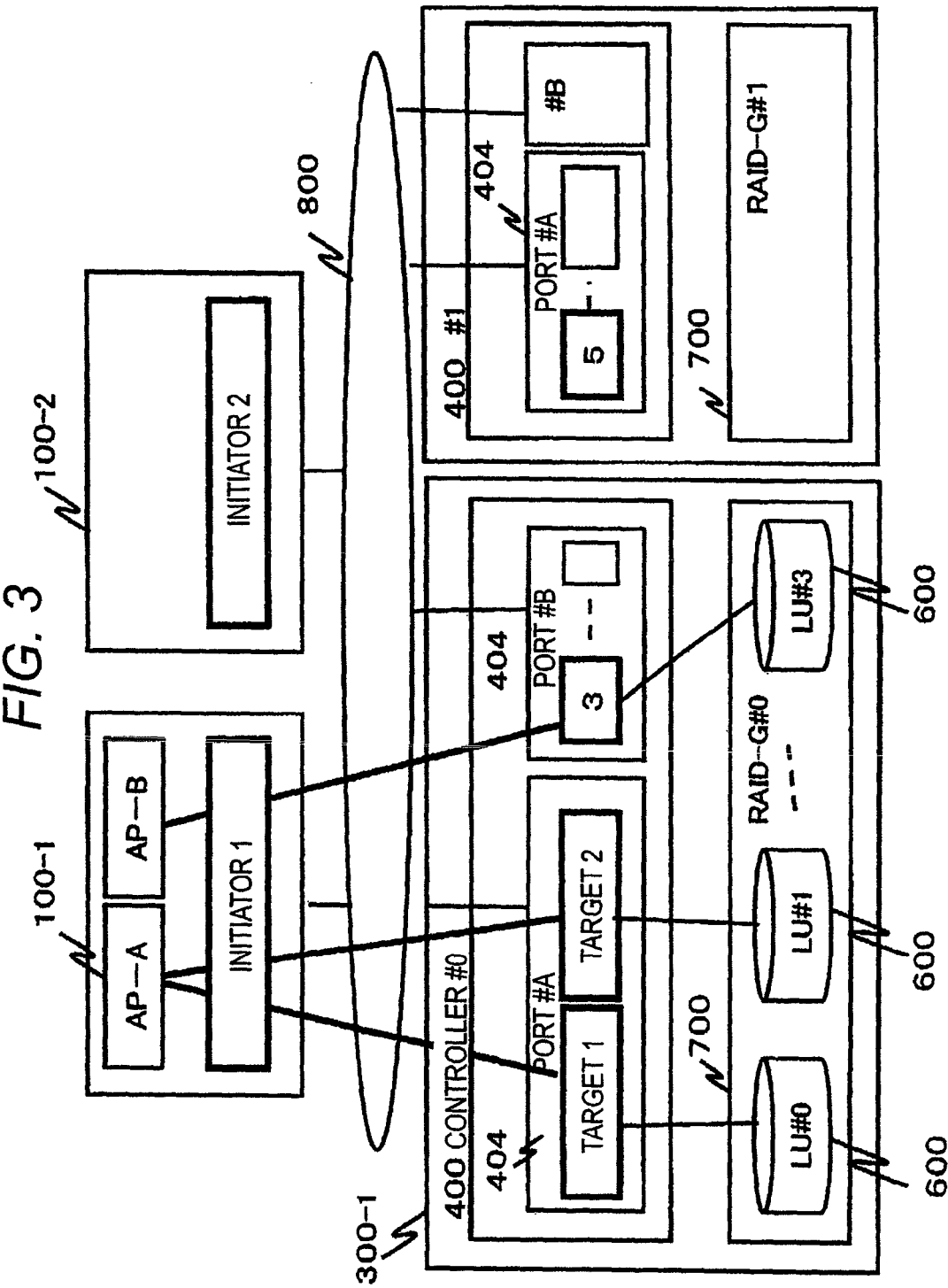
FIG. 3 is an explanatory diagram conceptually showing the configuration of hosts and volumes for configuration change in Embodiment 1 of the invention.
Figure 4:
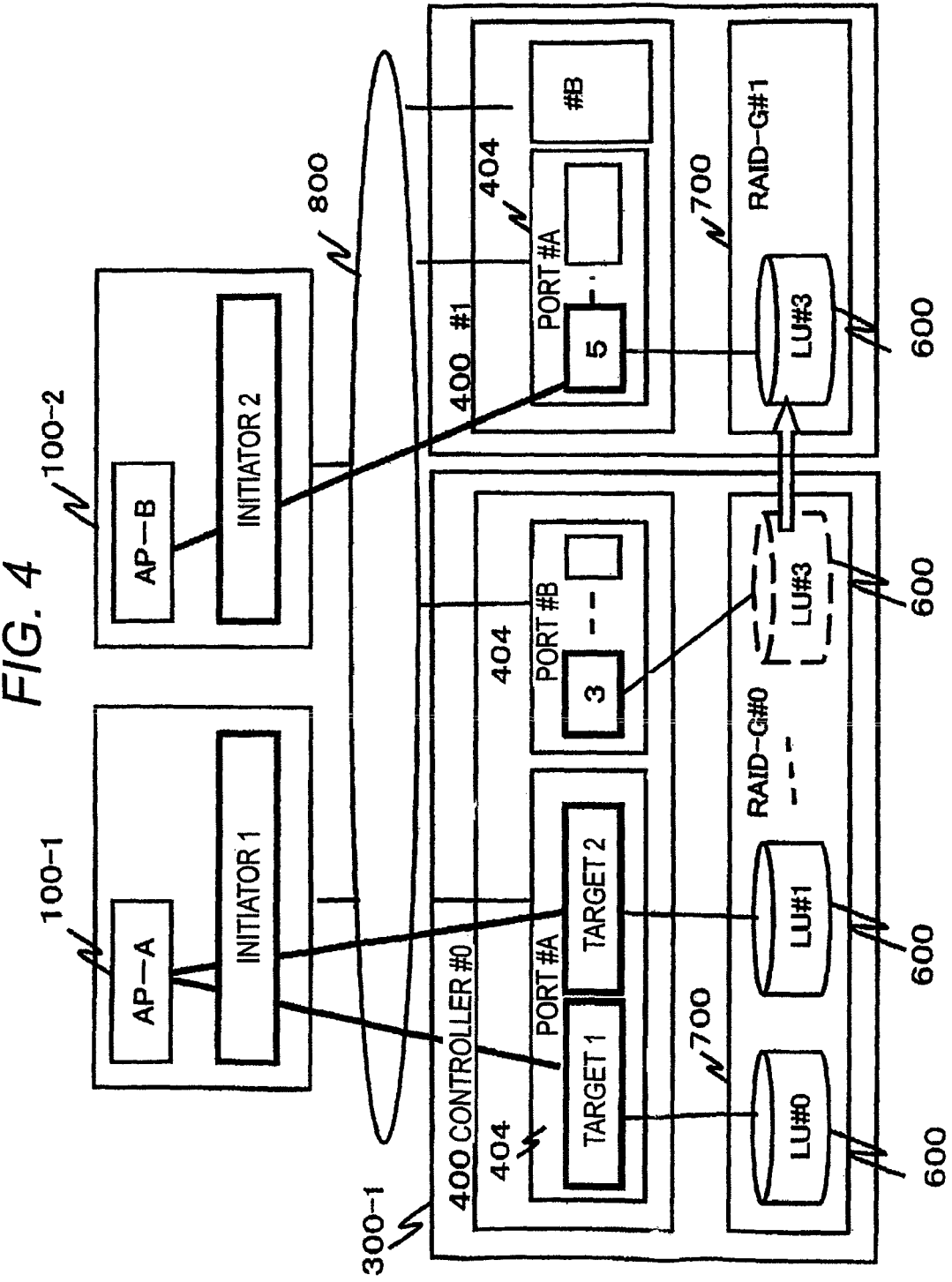
FIG. 4 is an explanatory diagram conceptually showing the configuration of hosts and volumes after the configuration change in Embodiment 1 of the invention.

FIG. 3 is a diagram showing the LU configuration before the configuration change. FIG. 4 is a diagram showing the LU configuration after the configuration change. The reference numeral 110-1 designates the AP registration table of the host 100-1 before the configuration change. The reference numeral 110-2 designates the AP registration table of the host 100-2 before the configuration change. The reference numeral 110-1A designates the AP registration table of the host 100-1 after the configuration change. The reference numeral 110-2A designates the AP registration table of the host 100-2 after the configuration change. The reference numerals 410-1A, 410-3A and 410-4A designate the AP table, the AP-volume correspondence table and the volume-RAID-G correspondence table, respectively, after the configuration change.

As shown in FIG. 9, the administrator deletes information about an APID (AP-B) from the AP registration table 110-1 of the host 100-1 and registers the APID (AP-B) and a volume ID (VOL1) in the AP registration table 110-2 of the host 100-2.

The administrator operates the iSCSI processing program 111 of the host 100-2 to execute discovery. The allocating program 112 of the host 100-2 receives a discovery request. The allocating program 112 performs a volume configuration change process for the APID (AP-B) because a port address for the APID (AP-B) has not been registered in the AP registration table 110-2 yet.

Although the allocating program 112 displays a parameter input screen in the flow chart of the configuration change process in FIG. 10, the administrator does not input any value because the process is for configuration change. In the volume allocating process of the host 100-2, an iSCSI initiator name, host ID information and performance information of the host 100-2 are acquired from OS configuration information and an allocation request is sent to the allocation management program 413 of each storage device 300.

In step S1001 of FIG. 10, the allocation management program 413 confirms registration of the APID (AP-B) on each storage device. In step S1002, the configuration change process is performed because the APID (AP-B) has been already registered in the AP table 410-1 in FIG. 6. For the configuration change process, the allocation management program 413 acquires the value of host performance 41014 from the AP table 410-1 based on the acknowledged APID. When a new value of host performance is higher than the registered value of host performance, the allocation management program 413 performs a volume migration process by selecting an RAID-G capable of providing higher IO performance than the current IO performance in the following procedure. Assume now that the CPU performance of the host 100-1 is 1.0 GHz and the CPU performance of the host 100-2 is 2.0 GHz which is higher than that of the host 100-1. When the RAID-G cannot be selected, the migration process is not performed but the routine of processing goes to step S1009 in which a path change process of the storage device will be performed.

The volume migration process is performed as follows. First, in step S1003, the allocation management program 413 updates the RAID-G information table by collecting RAID-G information tables from allocation management programs 413 of other devices. In step S1004, the allocation management program 413 selects RAID-Gs consistent with a region allocation method 41124 of the currently allocated RAID-G. In step S1005, the allocation management program 413 selects RAID-Gs capable of providing higher IO performance than the current IO performance from the selected RAID-Gs in accordance with the HDD type 41123. In step S1006, the allocation management program 413 selects RAID-Gs lower in IO load and smaller in the number of IOs from the selected RAID-Gs in accordance with the number of IOs 41126. In step S1007, the allocation management program 413 selects an RAID-G capable of storing all the volume of AP-B from the selected RAID-Gs in accordance with the free capacity 41125. If there are RAID-Gs obtained, an arbitrary RAID-G is selected from the obtained RADI-Gs.

In step S1008, the allocation management program 413 copies the volume into the selected RAID-G by using the copy function of the storage device. RAID-G information after migration is reflected on the volume-RAID-G correspondence table 410-4A (FIG. 7) in the AP management table 410. In this example, the allocation management program 413 selects device ID (0) and RAID-G (1) from the RIAD-G information table 411-2 (FIG. 8) in the resource management table 411 and copies an LU in the device. When the selected RAID-G is in another device, the allocation management program 413 allocates a new target, maps the LU on the target and changes the respective AP management tables 410 of the migration source and destination storage devices.

In the step S1009, the allocation management program 413 registers the acknowledged iSCSI initiator name in the target by the path change process. The allocation management program 413 registers the iSCSI initiator name in the AP-volume correspondence table 410-3A (FIG. 7) and sets the host ID information in the AP table 410-1A. In step S1010, the allocation management program 413 notifies the allocating program 112 of the completion of the configuration change. The allocation management program 413 notifies the allocating program 112 of the port address of the target at which the volume has been generated. In step S1011, the allocating program 112 sets the acknowledged port address of the target in the AP registration table 110-2A (FIG. 9). The allocating program 112 registers the port address in the iSCSI processing program 111. Thus, processing is terminated.

After the aforementioned processing, the iSCSI processing program 111 continues the discovery process which is performed on the port address of the set target. By the discovery process, the disk access program 412 notifies the iSCSI processing program 111 of the name of the target in which the iSCSI initiator name has been registered. The iSCSI processing program 111 performs a log-in process on the acknowledged target to access the migration destination volume.

Embodiment 2

A process for allocating a new volume to an application will be described with reference to FIGS. 11, 12, 13, 15 and 17.

Figure 11:
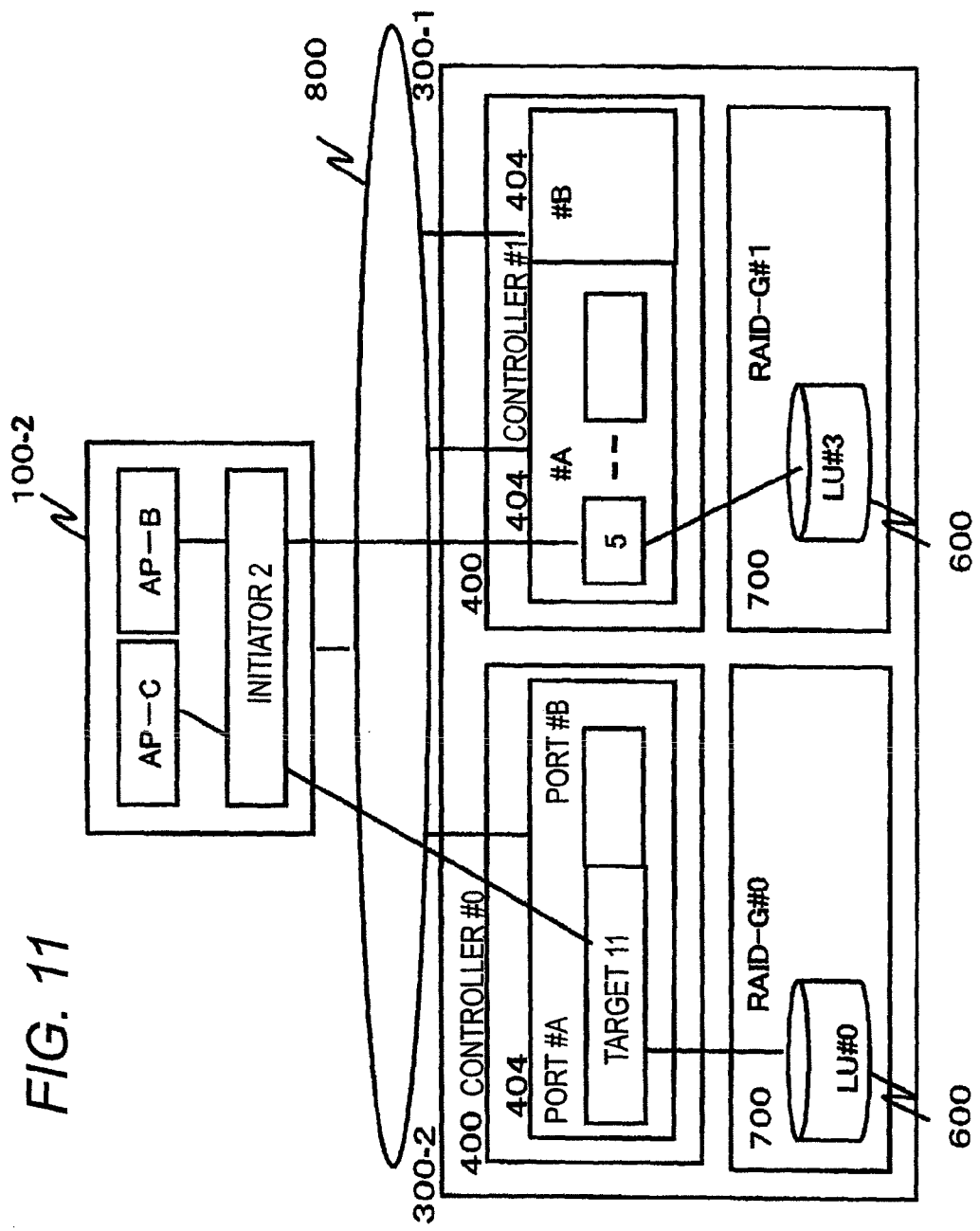
FIG. 11 is an explanatory diagram conceptually showing the configuration of a host and volumes in an allocation process in Embodiment 2 of the invention.

FIG. 11 is a diagram showing the LU configuration after new registration of an application. The reference numeral 110-2 designates the AP registration table of the host 100-2. As shown in FIG. 12, the reference numeral 110-2A designates the AP registration table before AP registration, and the reference numeral 110-2B designates the AP registration table after AP registration. As shown in FIG. 14, the reference numerals 410-1B, 410-2B, 410-3B and 410-4B designate the AP table, the volume table, the AP-volume correspondence table and the volume-RAID-G correspondence table, respectively, after AP registration.

Figure 15:
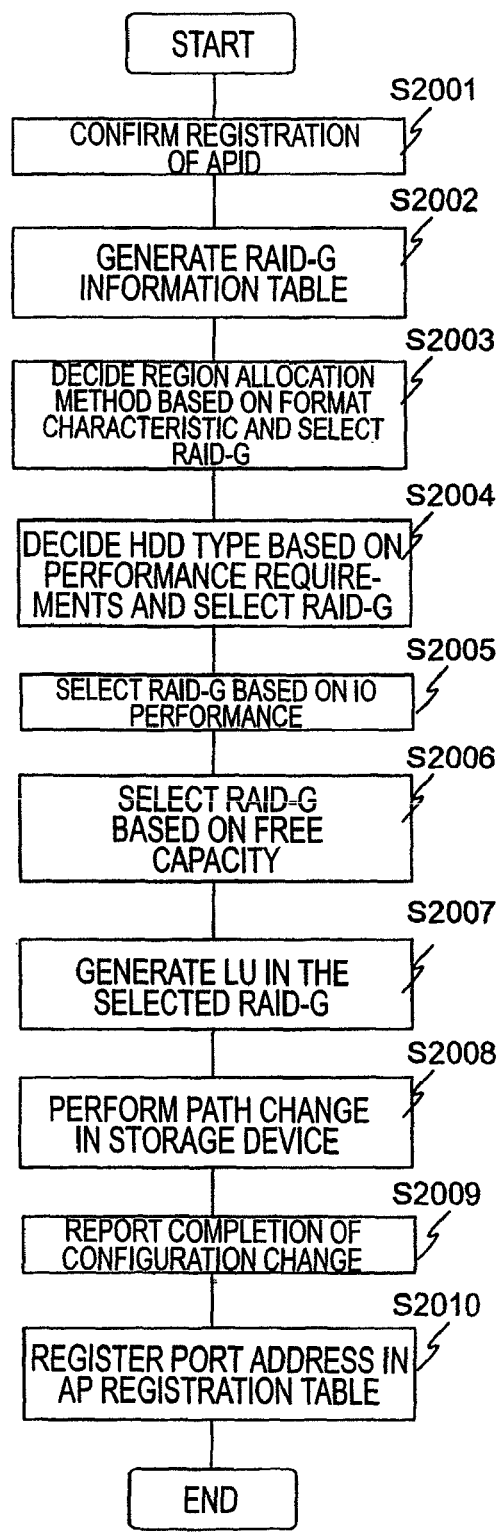
FIG. 15 is a flow chart showing the allocation process in Embodiment 2 of the invention.
Figure 17:
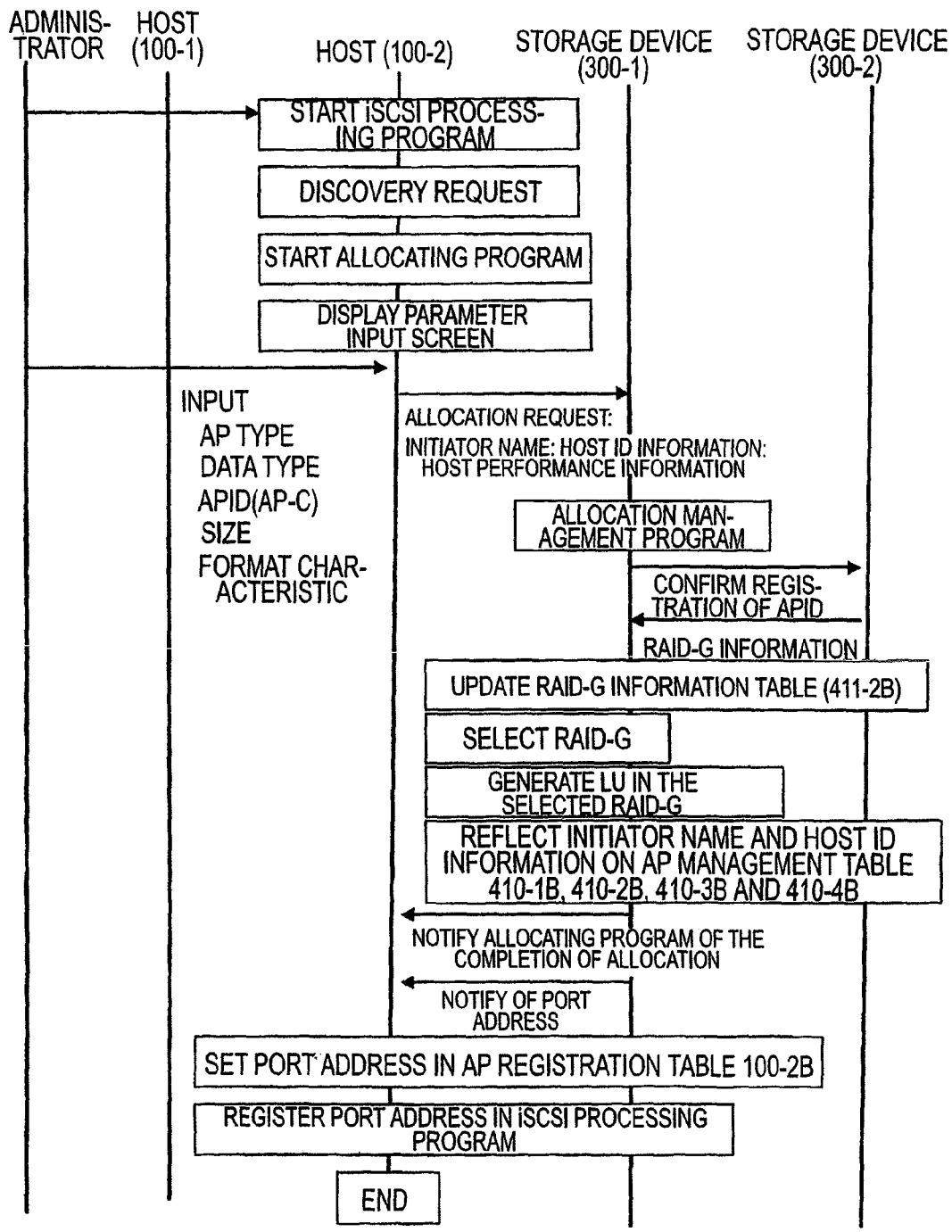
FIG. 17 is a sequence diagram showing the allocation process in Embodiment 2 of the invention.

FIG. 15 is a flow chart showing an allocation process in Embodiment 2 of the invention. FIG. 17 is a sequence diagram showing the allocation process in Embodiment 2 of the invention.

An administrator registers an APID (AP-C) and a volume ID (VOL1) in the AP registration table 110-2A (FIG. 12).

The administrator operates an iSCSI processing program to execute discovery. An allocating program 112 receives a discovery request. The allocating program 112 performs a volume allocation process for the APID (AP-C) because the port address for the APID (AP-C) has not been registered in the AP registration table 110-2A yet.

In step S2001 in FIG. 15, the allocating program 112 displays a parameter input screen and the administrator enters the APID (AP-C), the AP type of VOL 1, format characteristic, the data type and the size on the parameter input screen. For the volume allocation process, the allocating program 112 acquires the iSCSI initiator name, host ID information and host performance information of the host 100-2 from OS configuration information and sends an allocation request to an allocation management program 413 of a storage device 300.

Figure 13:
FIG. 13 is an explanatory view of a resource management table concerned with the allocation process in Embodiment 2 of the invention.

The allocation management program 413 performs the allocation process as follows. First, in step S2002, the allocation management program 413 updates an RAID-G information table by collecting RAID-G information tables from allocation management programs 413 of other devices. The reference numeral 411-2B designates the updated RAID-G information table (FIG. 13). In step S2003, the allocation management program 413 obtains a region allocation method in accordance with the value of format characteristic and selects RAID-Gs consistent with the region allocation method. For example, a virtual region can be selected for a volume partially formatted because virtual allocation can be used for the volume. In step S2004, the allocation management program 413 selects RAID-Gs capable of providing higher IO performance from the RAID-Gs selected in accordance with the performance requirement, in accordance with the HDD type 41123. When, for example, the volume has the AP type "DB" and the data type "DB", HDD high in reliability and performance is selected. When, for example, the volume has the data type "File", HDD different from the HDD for "DB" is selected because the performance requirement for "File" can be made lower than that for "DB".

In step S2005, the allocation management program 413 selects RAID-Gs lower in IO load and smaller in the number of IOs from the selected RAID-Gs in accordance with the number of IOs 41126. In step 2006, the allocation management program 413 selects an RAID-G capable of storing the volume of AP-C from the selected RAID-Gs in accordance with the free capacity 41125. In step S2007, the allocation management program 413 generates an LU in the selected RAID-G. The allocation management program 413 allocates a target and reflects information after LU generation on the AP management table 410. When the selected RAID-G is in another device, the allocation management program 413 notifies the allocation management program 413 of the other device of the selected RAID group so that the allocation management program 413 of the other device performs generation of an LU, generation of a target and updating of the AP management table 410.

In step S2008, the allocation management program 413 registers an iSCSI initiator name in the target by a path setting process. The allocation management program 413 sets the iSCSI initiator name and host ID information in the AP management table 410. The reference numerals 410-1B, 410-2B, 410-3B and 410-4B designate the updated tables (FIG. 14). In step S2009, the allocation management program 413 notifies the allocating program 112 of the completion of the allocation. The allocation management program 413 notifies the allocating program 112 of the port address of the target at which the volume has been generated. In step S2010, the allocating program 112 sets the acknowledged port address of the target in the AP registration table 110-23 (FIG. 12). The allocating program 112 registers the port address in the iSCSI processing program 111. Thus, processing is terminated.

After the aforementioned processing, the iSCSI processing program 111 continues the discovery process which is performed on the port address of the set target. By the discovery process, the disk access program 412 notifies the iSCSI processing program 111 of the name of the target for which the iSCSI initiator name has been registered. The iSCSI processing program 111 performs a log-in process on the acknowledged target to access the generated volume.

What is claimed is:

1. A storage system management method for a storage system that includes a plurality of host computers configured to operate an application and a plurality of storage devices each configured to provide a corresponding volume to the application, each storage device storing application management information, the application management information of each storage device including an identifier of the application and a security item related to the application and the volume provided by the storage device, the security item of the application management information of each storage device including a port address related to the application, each host computer maintaining application registration information related to the application and the port address related to the application for each storage device, the storage management method comprising:

sending, by each host computer, an I/O request to a storage medium of a corresponding storage device of the plurality of storage devices through an initiator of the host computer;

processing, by a controller of each storage device of the plurality of the storage devices, the I/O request sent to storage device by referring to the application management information of the storage device;

migrating the application from a first host computer to a second host computer;

changing a path for a first storage device of the plurality of storage devices between the application and the corresponding volume provided by the first storage device; and updating the application management information of the first storage device based on the changed path;

providing, by the storage device, a notification of completion of a configuration change in the plurality of storage devices; and updating, by the host computer, the application registration information of the host computers with the changed path for the first storage device, and wherein where the security item of the application management information of each storage device includes an identifier of the initiator through which the I/O request sent was sent to the storage device.

2. The storage system management method according to claim 1, wherein the security item of the application management information of each storage device includes an identifier of the corresponding volume provided by the storage device, and wherein the storage system management method further comprises migrating the volume associated with the migrated application from the first storage device to a second storage device of the plurality of storage devices.

3. A storage system, comprising:

a plurality of host computers configured to operate an application; and a plurality of storage devices each configured to provide a corresponding volume to the application, each storage device storing application management information, the application management information of each storage device including an identifier of the application and a security item related to the application and the volume provided by the storage device, the security item of the application management information of each storage device including a port address related to the application, wherein each host computer sends an I/O request to a storage medium of a corresponding storage device of the plurality of storage devices through an initiator of the host computer, wherein a controller of each storage device of the plurality of the storage devices processes the I/O request sent to the storage device by referring to the application management information of the storage device, wherein the security item of the application management information of each storage device includes an identifier of the initiator through which the I/O request was sent to the storage device, wherein the host computer migrates the application from a first host computer to a second host computer, wherein a first storage device of the plurality of storage devices changes a path between the application and the corresponding volume provided by the first storage device and updates the application management information of the first storage device based on the changed path, wherein each storage device provides a notification of completion of a configuration change in the plurality of storage devices, and wherein each host computer maintains application registration information related to the application and the port address and updates the application registration information with the changed path for the first storage device.

4. The storage system according to claim 3, wherein the security item of the application management information of each storage device includes an identifier of the corresponding volume provided by the storage device, and wherein the first storage device migrates the volume associated with the migrated application from the first storage device to a second storage device of the plurality of storage devices.

* * * * *